F. G. BULLIS.
SPOTLIGHT FOR MOTOR VEHICLES.
APPLICATION FILED MAR. 22, 1920.
1,387,347.
Patented Aug. 9, 1921.
2 SHEETS—SHEET 1.
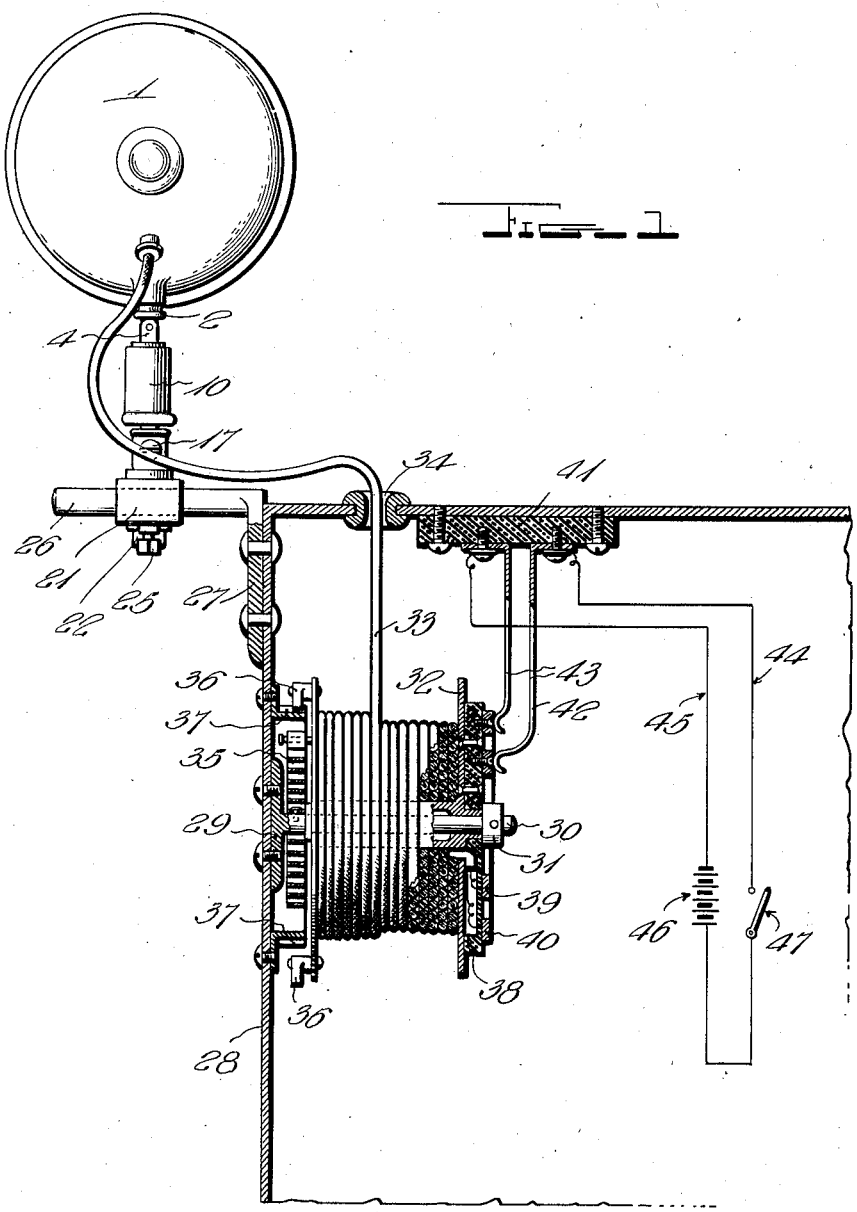
Inventor
Frank G. Bullis
By H. B. Willson &co.
Attorneys F. G. BULLIS.
SPOTLIGHT FOR MOTOR VEHICLES.
APPLICATION FILED MAR. 22, 1920.
1,387,347.
Patented Aug. 9, 1921.
2 SHEETS—SHEET 2.
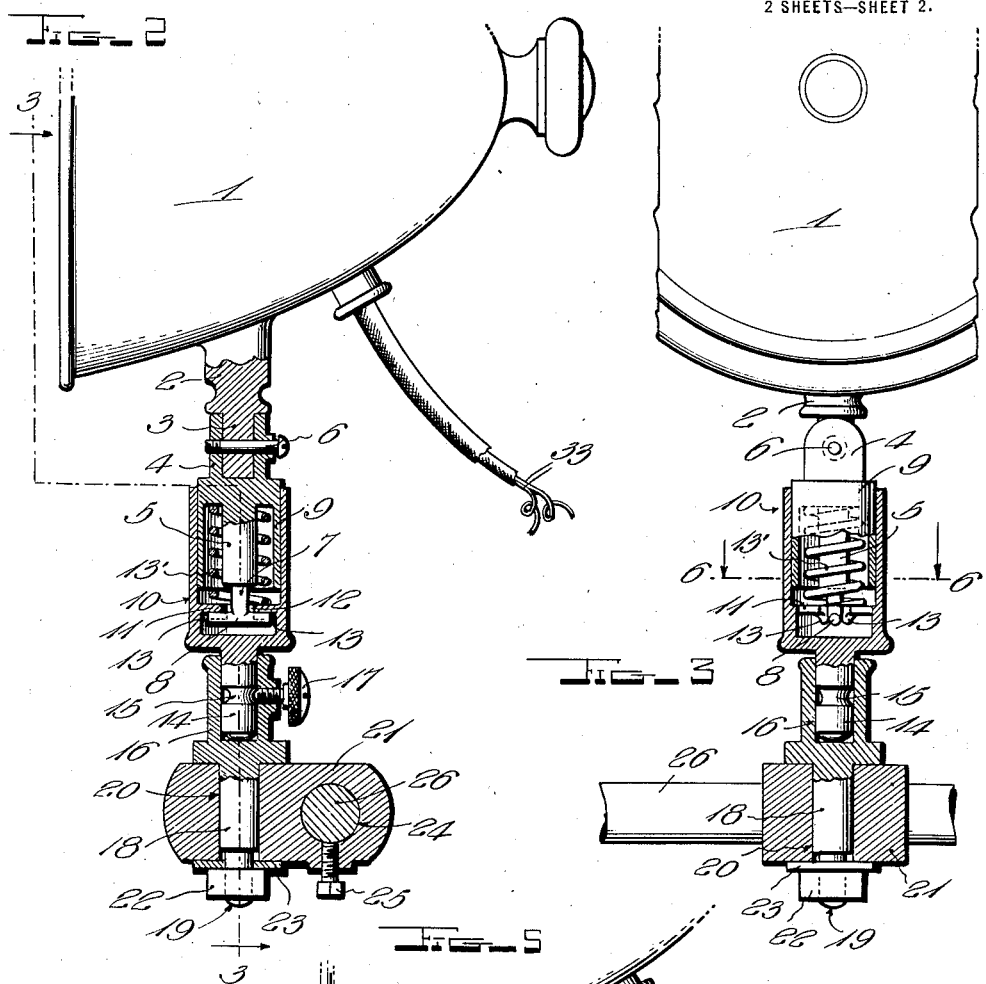
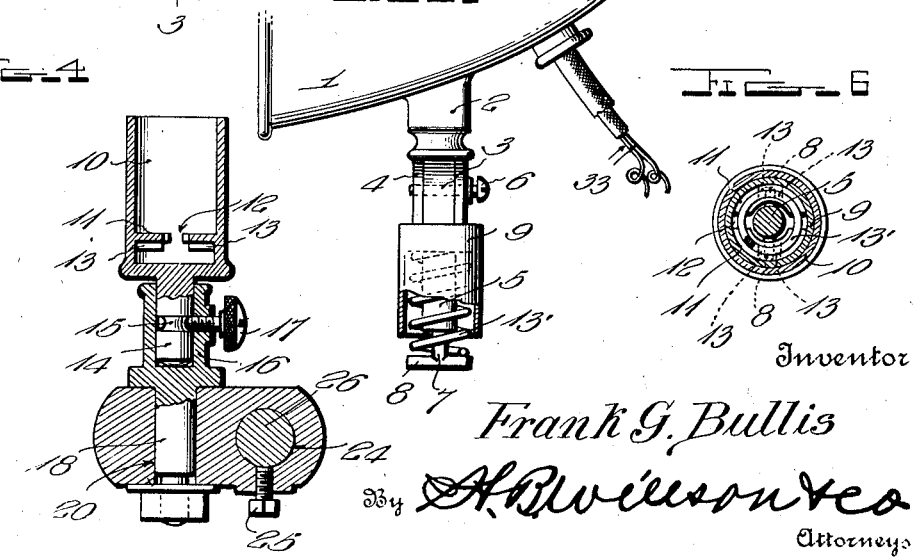
Inventor
Frank G. Bullis
By H. B. Willson &co.
Attorneys

UNITED STATES PATENT OFFICE.

FRANK GRANT BULLIS, OF VANCOUVER, WASHINGTON.

SPOTLIGHT FOR MOTOR-VEHICLES.

1,387,347.   Specification of Letters Patent.   Patented Aug. 9, 1921.

Application filed March 22, 1920. Serial No. 367,767.

*To all whom it may concern:*

Be it known that I, FRANK G. BULLIS, a citizen of the United States, residing at Vancouver, in the county of Clarke and State of Washington, have invented certain new and useful Improvements in Spotlights for Motor-Vehicles; and I do declare the following to be a full, clear, and exact description of the invention, such as will enable others skilled in the art to which it appertains to make and use the same.

This invention relates generally to illuminating devices, but particularly to spotlights especially applicable for use in connection with motor vehicles.

The principal object of the invention is to provide a means for mounting a spotlight upon motor vehicles or the like so that it can be removed from its support and used as a trouble light, the current carrying wires leading from the source of the current to the light being carried upon the drum and unwound therefrom as the light is removed from its usual support and used as a trouble light.

Another object of the invention is to provide a device of this class, the construction of which is comparatively simple, strong, durable and cheap to manufacture, and which makes the device well adapted for the purpose for which it is designed.

With these and other objects in view, the invention consists of the novel features of construction, and the combination and arrangement of parts as will be hereinafter fully described and claimed.

The preferred form of the invention is illustrated in the accompanying drawings wherein:

Figure 1 is an assembly of the various parts of the device, the spotlight being shown in elevation and the box upon which it is mounted being shown in section so that the drum upon which the current carrying wires are wound can be seen.

Fig. 2 is an enlarged vertical sectional view of the supporting post of the light.

Fig. 3 is a sectional view taken substantially on the line 3—3 of Fig. 2.

Fig. 4 is a sectional view of the parts of the supporting post of the light which are permanently fixed to the aforementioned box.

Fig. 5 is a view partly in elevation and partly in section of the lower portion of the light and parts of the supporting post carried thereby.

Fig. 6 is a transverse sectional view taken substantially on the line 6—6 of Fig. 3.

In the embodiment illustrated the numeral 1 designates a spotlight which is constructed in the usual manner and which has depending from its lower side a post 2, the lower end of which is reduced and apertured to form an attaching ear or lug 3. This attaching ear 3 is fitted between a pair of spaced lugs 4 projecting longitudinally from the upper end of a stem 5 and affixed thereto by means of a screw 6 which extends through apertures in the lugs 4 alined with the aperture in the ear 3.

The stem 5 is of T-shaped construction being provided at its lower end with a diametrically reduced portion 7 having a cross head 8 at its free end. If desired, the stem 5 may be surrounded by an annular shell 9 formed integrally therewith at the upper end thereof.

The numeral 10 designates a cup into which the stem is disposed. The external diameter of the cup 10 is such that the shell 9 will snugly fit therein. Formed integrally with the cup 10 adjacent the lower end thereof is a false bottom 11 provided with a narrow diametrically extending slot 12 adapted to receive the cross bar 8. The lower side of the bottom 11 is provided with a pair of spaced parallel ridges 13 which extend substantially at right angles to the slot 12 for a purpose hereinafter described.

When the stem 5 is inserted in the cup 10 the former is turned so that the cross bar 8 extends in a direction parallel with respect to the slot 12 so that cross bar may be inserted through the slot 12 and depressed so as to clear the ridges 13 in order to be turned transversely of the slot 12 and be seated between said ridges 13. A coiled spring 13' surrounding the stem 5 and bearing at its upper end against the shoulder formed at the junction of the stem with the shell 9 and at its lower end upon the upper side of the false bottom 11, serves to hold the parts in engaged position. When the parts are in engaged or interlocked position illustrated in Figs. 2 and 3, the coiled spring 13' is under compression and it must be still further compressed in disconnecting the stem from the cup.

Projecting from the lower end of the cup 10 is a stem 14 having a peripheral groove 15 cut therein. The stem 14 is disposed in a socket 16 and has a swiveled connection therewith by means of a set screw 17 threaded in the wall of the socket and having its inner end disposed in the groove 15.

Projecting from the lower end of the socket 16 is a stem 18 provided at its lower end with a reduced threaded portion 19. This stem 18 is inserted through a vertical opening 20 in a block 21 and fixed to said block by a nut 22 disposed upon the threaded portion 19, a washer 23 being interposed between the nut and the lower side of the block 21. The block 21 is provided with a horizontal opening 24, and extending through and clamped in this opening by means of a set screw 25 is the horizontal arm 26 of a bracket provided with attaching plate 27 riveted or otherwise secured to a support.

The support just mentioned may be of any suitable form, but for the purpose of illustration it is shown as being a box 28. Fixed upon a side wall of the box by screws or other suitable means is a plate 29 carrying a horizontally extending pintle or shaft 30. Rotatably mounted upon the shaft 30 and retained thereon by means of a collar 31 is a drum 32 upon which the current carrying wires 33 leading to the spotlight 1 are wound. The wires 33 pass through a bushing protected opening 34 in the box 28 on their way to the spotlight 1.

In conjunction with the drum 32 is a coiled spring 35 which has one end connected to one of the end flanges of the drum and has its other end connected to the shaft 30 so that the drum is spring core wound. Gravity dogs or pawls 36 are pivoted upon one of the end flanges of the drum 32 and engage a ratchet 37 secured to the adjacent wall of the box 28 so as to maintain the drum 32 in any position.

The end flange of the drum 32 remote from that carrying the pawls 36 and to which the spring 35 is connected, carries a plate 38 of insulating material, and to this is secured in any suitable manner a pair of concentrically arranged contact rings 39 and 40. One of the current carrying wires leading from the spotlight 1 is connected to the ring 39 while the other wire is connected to the ring 40. The rings 39 and 40 are obviously of current conducting material.

Secured in any suitable manner to the top of the box 28 is a block 41 of insulating material and fixed at one of their ends to this is a pair of current carrying contact fingers 42 and 43, the finger 42 engaging the contact ring 39 while the finger 43 engages the contact ring 40. Conductors 44 and 45 leading from a battery or other suitable source of current 46 are connected electrically to the fingers 42 and 43 respectively. The conductor 44 has disposed within its length a switch 47 by which the current is turned on and off.

Under ordinary conditions while the motor vehicle is traveling, the spotlight is to be carried in the position shown in Figs. 1, 2 and 3 of the drawings and by reason of the fact that the stem 14 has a swiveled connection with the socket 16, it may be turned axially so as to cause the light to project from the spotlight to be thrown from one side of the vehicle to the other. Should it be desired to use a light in repairing or examining the engine or tires of the vehicle or for any other purpose, the spotlight can be removed from its support by grasping the post 2 and depressing it until the cross bar 8 is depressed by the ridges 13, and then turning the post and stem 5 so that the cross bar 8 may be withdrawn from the slot 12 and entirely removed from the cup 10. After the spotlight is disconnected from the cup 10, it may be moved to the desired place, the conductors 33 being unwound from the drum 32. During the unwinding of the drum 32 the spring 35 will be wound so that when the light is replaced the conductors will be automatically re-wound upon the drum. The gravity pawls 36 engaging the ratchet 37 serve to lock the drum against movement when tension upon the conductors 33 has been removed, but permit the drum to automatically re-wind.

The contact fingers 42 and 43 being constantly in engagement with the contact rings 39 and 40 cause the current carrying conductors to be electrically connected with said contact fingers and in the circuit at all times. The condition of the circuit as heretofore explained is controlled by means of the switch 47.

From the foregoing description, taken in connection with the accompanying drawings, the construction, use and operation of the device will be readily understood.

Various changes in form, proportion and in the minor details of construction may be resorted to without departing from the invention as defined in the claims.

I claim as my invention:

1. In a device of the character described, a spotlight mounting including a cup having a slotted bottom, and a spotlight having a stem terminating in a cross bar for passing through the slot, a shell positioned about the stem in spaced relation thereto with its upper end connected with the stem and its lower end open and terminating short of the cross bar, and a spring positioned about the stem between the cross bar and the upper end of said shell.

2. A device of the class described comprising a support, a socket carried by said support, a cup having a swiveled connection with said socket and having a slotted false bottom therein, a spotlight having a T-shaped stem disposed in said cup with its crossbar inserted through said slot and turned transversely thereof to removably anchor said stem in said cup, and a coiled spring surrounding said stem and confined between a portion thereof and said false bottom.

In testimony whereof I have hereunto set my hand.

FRANK GRANT BULLIS.